United States Patent
Xue et al.

(10) Patent No.: US 11,291,047 B2
(45) Date of Patent: Mar. 29, 2022

(54) RADIO-UNLICENSED WITHIN-CHANNEL OCCUPANCY TIME MULTIPLE DOWNLINK-UPLINK SWITCHING SUPPORTED BY ACTIVE CHANNEL INDICATION

(71) Applicant: QUALCOMM Incorporated, San Diego, CA (US)

(72) Inventors: Yisheng Xue, San Diego, CA (US); Xiaoxia Zhang, San Diego, CA (US); Aleksandar Damnjanovic, Del Mar, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 16/723,902

(22) Filed: Dec. 20, 2019

(65) Prior Publication Data
US 2020/0221498 A1    Jul. 9, 2020

Related U.S. Application Data

(60) Provisional application No. 62/789,291, filed on Jan. 7, 2019.

(51) Int. Cl.
*H04W 74/08* (2009.01)
*H04W 74/02* (2009.01)
(Continued)

(52) U.S. Cl.
CPC ....... *H04W 74/0808* (2013.01); *H04L 5/0055* (2013.01); *H04W 16/14* (2013.01); *H04W 72/0446* (2013.01); *H04W 74/02* (2013.01)

(58) Field of Classification Search
CPC ............ H04W 74/0808; H04W 16/14; H04W 72/0446; H04W 74/02; H04L 5/0055
See application file for complete search history.

(56) References Cited

U.S. PATENT DOCUMENTS

2015/0326290 A1   11/2015  Harrison et al.
2018/0343589 A1*  11/2018  Li ........................ H04W 16/14
(Continued)

OTHER PUBLICATIONS

LG Electronics, "Discussion on AUL-initiated COT sharing for LAA", 3GPP TSG RAN WG1 Meeting #94, R1-1808464,3GPP TSG RAN WG 1 Meeting #94bis, R1-1810124, 3rd Generation Partnership Project (3GPP), Gothenburg, Sweden, Aug. 20-24, 2018 (Year: 2018).*

(Continued)

*Primary Examiner* — Michael Thier
*Assistant Examiner* — Nevena Zecevic Sandhu
(74) *Attorney, Agent, or Firm* — Liem T. Do

(57) ABSTRACT

New radio (NR) unlicensed (NR-U) operations are discussed with channel occupancy time (COT) multiple downlink-uplink switching opportunities supported by an active channel indication. A network node that initiates a COT for transmissions may identify a within-channel occupancy time (COT) scheduled downlink-uplink switching configuration. After beginning transmissions on the COT, the node receives an active channel indication from one or more additional network nodes. In response to the active channel indication, the node may then perform communications with the node from which the active channel indication is received according to the within-COT scheduled downlink-uplink switching configuration for the current COT on a shared communication channel.

30 Claims, 11 Drawing Sheets

(51) Int. Cl.
  *H04W 16/14*   (2009.01)
  *H04W 72/04*   (2009.01)
  *H04L 5/00*    (2006.01)

(56) References Cited

U.S. PATENT DOCUMENTS

| | | | | |
|---|---|---|---|---|
| 2019/0045544 | A1* | 2/2019 | Wang | H04L 5/0094 |
| 2019/0342915 | A1* | 11/2019 | Kim | H04W 72/0446 |
| 2020/0146063 | A1* | 5/2020 | Xu | H04W 74/0808 |
| 2021/0007101 | A1* | 1/2021 | Tooher | H04W 24/02 |
| 2021/0153245 | A1* | 5/2021 | Tooher | H04W 72/0453 |

OTHER PUBLICATIONS

TCL Communications, "Discussion on COT sharing for configured grants", 3GPP TSG RAN WG1 Meeting #94bis, R1-1811082, 3rd Generation Partnership Project (3GPP), Chengdu, China, Oct. 8-12, 2018 (Year: 2018).*

Huawei, et al., "NR Numerology and Frame Structure for Unlicensed Bands", 3GPP Draft, 3GPP TSG RAN WG1 Meeting #94bis, R1-1810123, 3rd Generation Partnership Project (3GPP), Mobile, Competence Centre, 658, Route Des Lucioles, F-06921, Sophia-Anti Polis Cedex, Franc, vol. RAN WG1, No. Chengdu, China, Oct. 8-12, 2018, Sep. 29, 2018 (Sep. 29, 2018), XP051517538, 14 pages, Retrieved from the Internet: URL: http://www.3gpp.org/ftp/tsg%5Fran/WG1%5FRL1/TSGR1%5F94b/Docs/R1%2D1810123%2Ezip. [retrieved on Sep. 29, 2018] figures 1-9 ections 1-6.

Huawei, et al., "DL Channels and Signals in NR Unlicensed Band", 3GPP Draft, 3GPP TSG RAN WG 1 Meeting #94bis, R1-1810124, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8-12, 2018, Sep. 29, 2018 (Sep. 29, 2018), XP051517539, 7 pages, Retrieved from the Internet:URL: http://www.3gpp.org/ftp/tsg%5Fran/WG1%5FRL1/TSGR1%5F94b/Docs/R1%2D1810124%2Ezip [retrieved on Sep. 29, 2018], the whole document.

International Search Report and Written Opinion—PCT/US2019/068334—ISA/EPO—dated Mar. 23, 2020.

NEC: "Considerations on Frame Structure Design for NR-U Operation", 3GPP Draft, R1-1812418 Frame Structure Design for NR-U Operation, 3rd Generation, Partnership Project (3GPP), Mobile, Competence Centre, 658, Route Des Lucioles, F-06921, Sophia-Anti Polis Cedex, Franc, vol. RAN WG1, No. Spokane, US, Nov. 12-16, 2018, Nov. 11, 2018 (Nov. 11, 2018), XP051554334, 4 pages, Retrieved from the Internet: URL: http://www.3gpp.org/ftp/Meetings%5F3GPP%5FSYNC/RAN1/Docs/R1%2D1812418%2Ezip. [retrieved on 2818-11-11] sections 1-6.

LG Electronics: "Discussion on AUL-Initiated COT Sharing for LAA", 3GPP TSG RAN WG1 Meeting #94, R1-1808464, Gothenburg, Sweden, Aug. 20-24, 2018, 4 Pages.

* cited by examiner

RADIO-UNLICENSED WITHIN-CHANNEL OCCUPANCY TIME MULTIPLE DOWNLINK-UPLINK SWITCHING SUPPORTED BY ACTIVE CHANNEL INDICATION

CROSS-REFERENCE TO RELATED APPLICATIONS

This application claims the benefit of U.S. Provisional Patent Application No. 62/789,291, entitled, "NR-U WITHIN-COT MULTIPLE DOWNLINK-UPLINK SWITCHING SUPPORTED BY ACTIVE CHANNEL INDICATION," filed on Jan. 7, 2019, which is expressly incorporated by reference herein in its entirety.

BACKGROUND

Field

Aspects of the present disclosure relate generally to wireless communication systems, and more particularly, to new radio (NR) unlicensed (NR-U) operations with channel occupancy time (COT) multiple downlink-uplink switching opportunities supported by an active channel indication.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication that includes identifying, by a network node, a within-channel occupancy time (COT) scheduled downlink-uplink switching configuration, receiving, by the network node, an active channel indication from one or more additional network nodes, and performing, by the network node, communications with the one or more additional network nodes according to the within-COT scheduled downlink-uplink switching configuration for a current COT on a shared communication channel.

In an additional aspect of the disclosure, a method of wireless communication includes detecting, by a network node, a transmission from a neighboring network node on a shared communication channel identifying a current COT initiated by the neighboring network node, determining, by the network node, an adequate channel quality of the shared communication channel, transmitting, by the network node, an active channel indication to the neighboring network node in response to determination of the adequate channel quality, and engaging, by the network node, in communications with the neighboring network node according to a within-COT scheduled downlink-uplink switching configuration for the current COT on the shared communication channel.

In an additional aspect of the disclosure, an apparatus configured for wireless communication includes means for identifying, by a network node, a within-COT scheduled downlink-uplink switching configuration, means for receiving, by the network node, an active channel indication from one or more additional network nodes, and means for performing, by the network node, communications with the one or more additional network nodes according to the within-COT scheduled downlink-uplink switching configuration for a current COT on a shared communication channel.

In an additional aspect of the disclosure, an apparatus configured for wireless communication includes means for detecting, by a network node, a transmission from a neighboring network node on a shared communication channel identifying a current COT initiated by the neighboring network node, means for determining, by the network node, an adequate channel quality of the shared communication channel, means for transmitting, by the network node, an active channel indication to the neighboring network node in response to determination of the adequate channel quality, and means for engaging, by the network node, in communications with the neighboring network node according to a within-COT scheduled downlink-uplink switching configuration for the current COT on the shared communication channel.

In an additional aspect of the disclosure, a non-transitory computer-readable medium having program code recorded thereon. The program code further includes code to identify, by a network node, a within-COT scheduled downlink-uplink switching configuration, code to receive, by the network node, an active channel indication from one or more additional network nodes, and code to perform, by the network node, communications with the one or more additional network nodes according to the within-COT scheduled downlink-uplink switching configuration for a current COT on a shared communication channel.

In an additional aspect of the disclosure, a non-transitory computer-readable medium having program code recorded thereon. The program code further includes code to detect, by a network node, a transmission from a neighboring network node on a shared communication channel identifying a current COT initiated by the neighboring network node, code to determine, by the network node, an adequate channel quality of the shared communication channel, code to transmit, by the network node, an active channel indication to the neighboring network node in response to determination of the adequate channel quality, and code to engage, by the network node, in communications with the neighboring network node according to a within-COT scheduled downlink-uplink switching configuration for the current COT on the shared communication channel.

In an additional aspect of the disclosure, an apparatus configured for wireless communication is disclosed. The apparatus includes at least one processor, and a memory coupled to the processor. The processor is configured to identify, by a network node, a within-COT scheduled downlink-uplink switching configuration, to receive, by the network node, an active channel indication from one or more additional network nodes, and to perform, by the network node, communications with the one or more additional network nodes according to the within-COT scheduled downlink-uplink switching configuration for a current COT on a shared communication channel.

In an additional aspect of the disclosure, an apparatus configured for wireless communication is disclosed. The apparatus includes at least one processor, and a memory coupled to the processor. The processor is configured to detect, by a network node, a transmission from a neighboring network node on a shared communication channel identifying a current COT initiated by the neighboring network node, to determine, by the network node, an adequate channel quality of the shared communication channel, to transmit, by the network node, an active channel indication to the neighboring network node in response to determination of the adequate channel quality, and to engage, by the network node, in communications with the neighboring network node according to a within-COT scheduled downlink-uplink switching configuration for the current COT on the shared communication channel.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
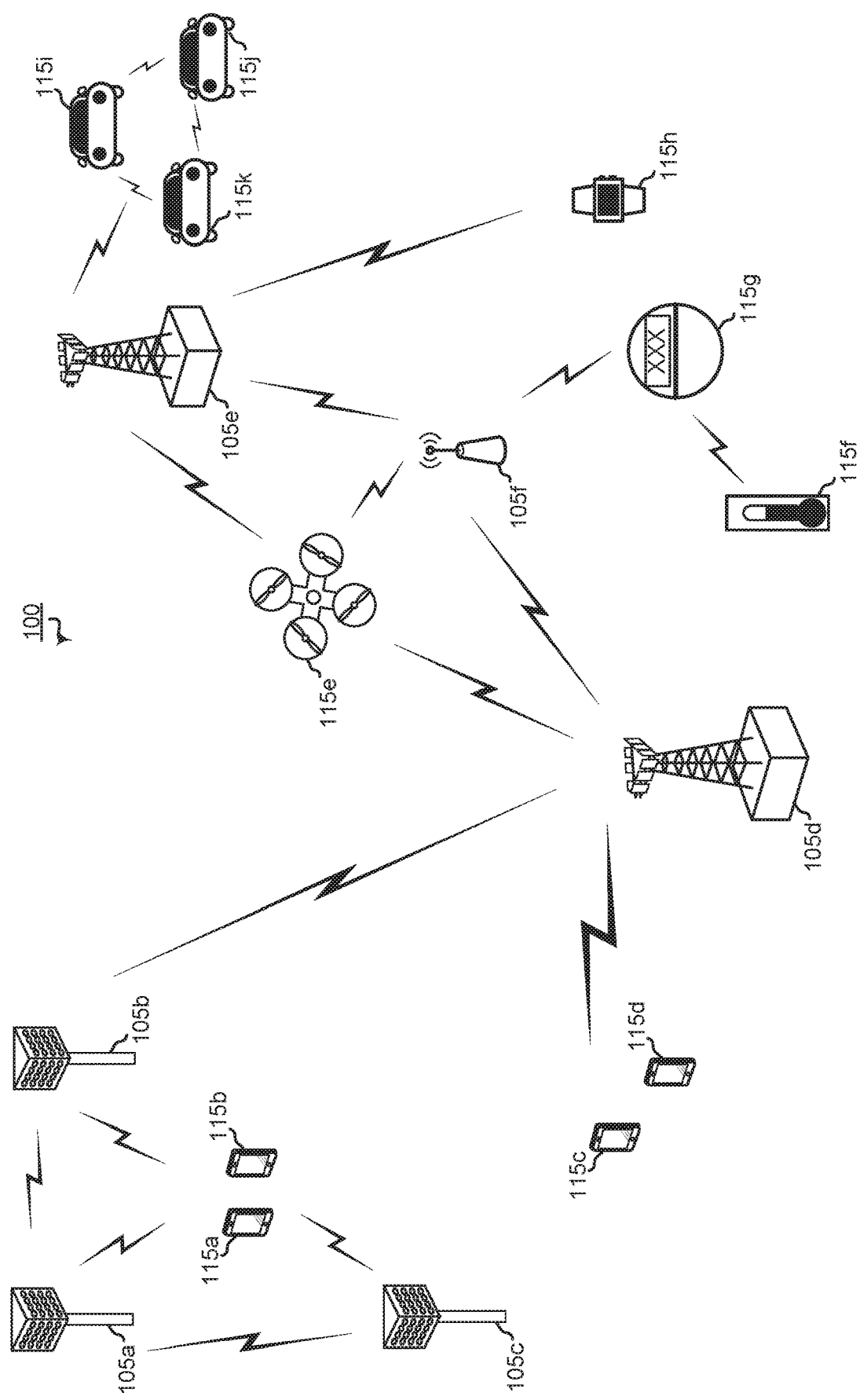
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
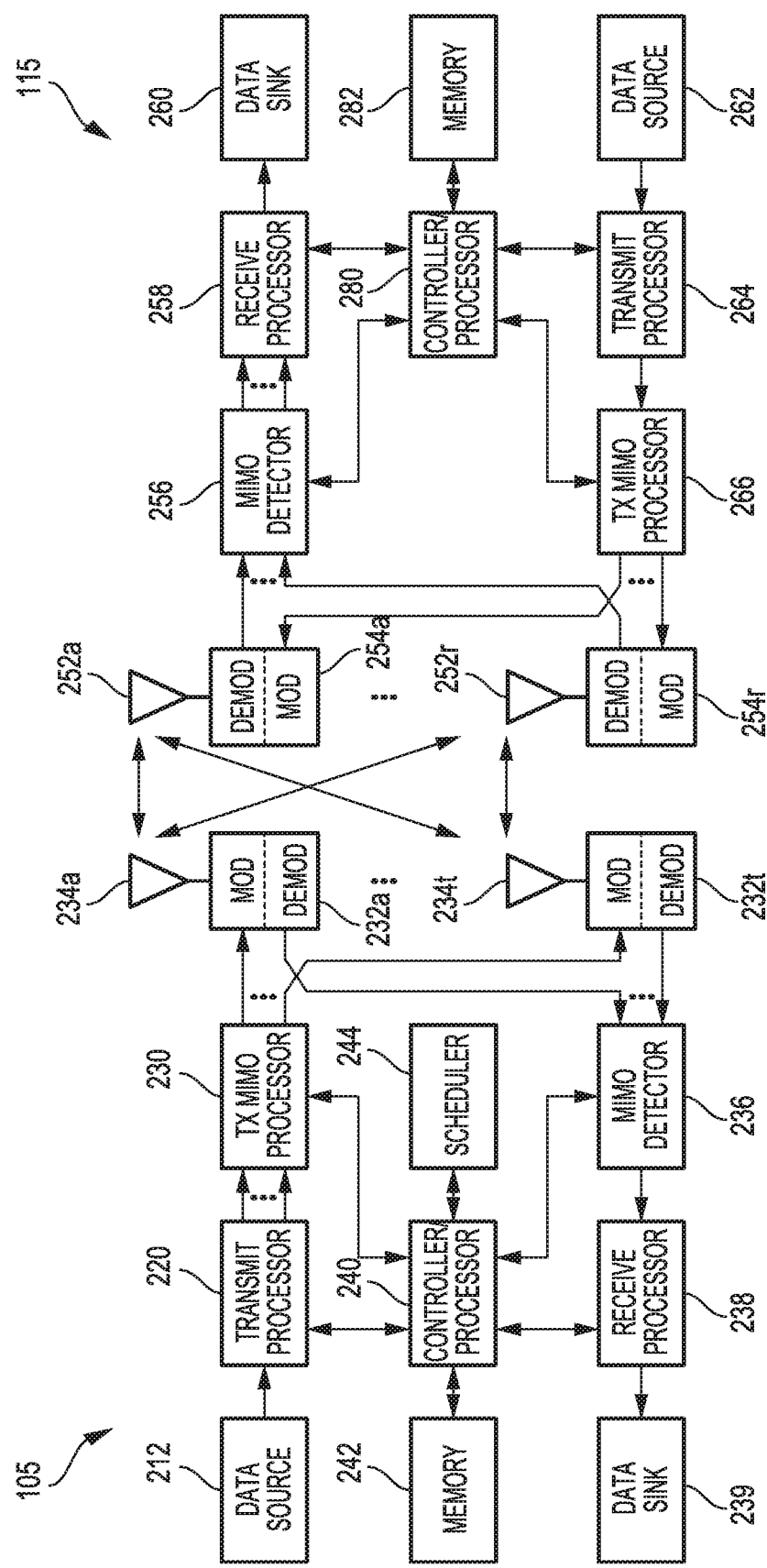
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4A and 4B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
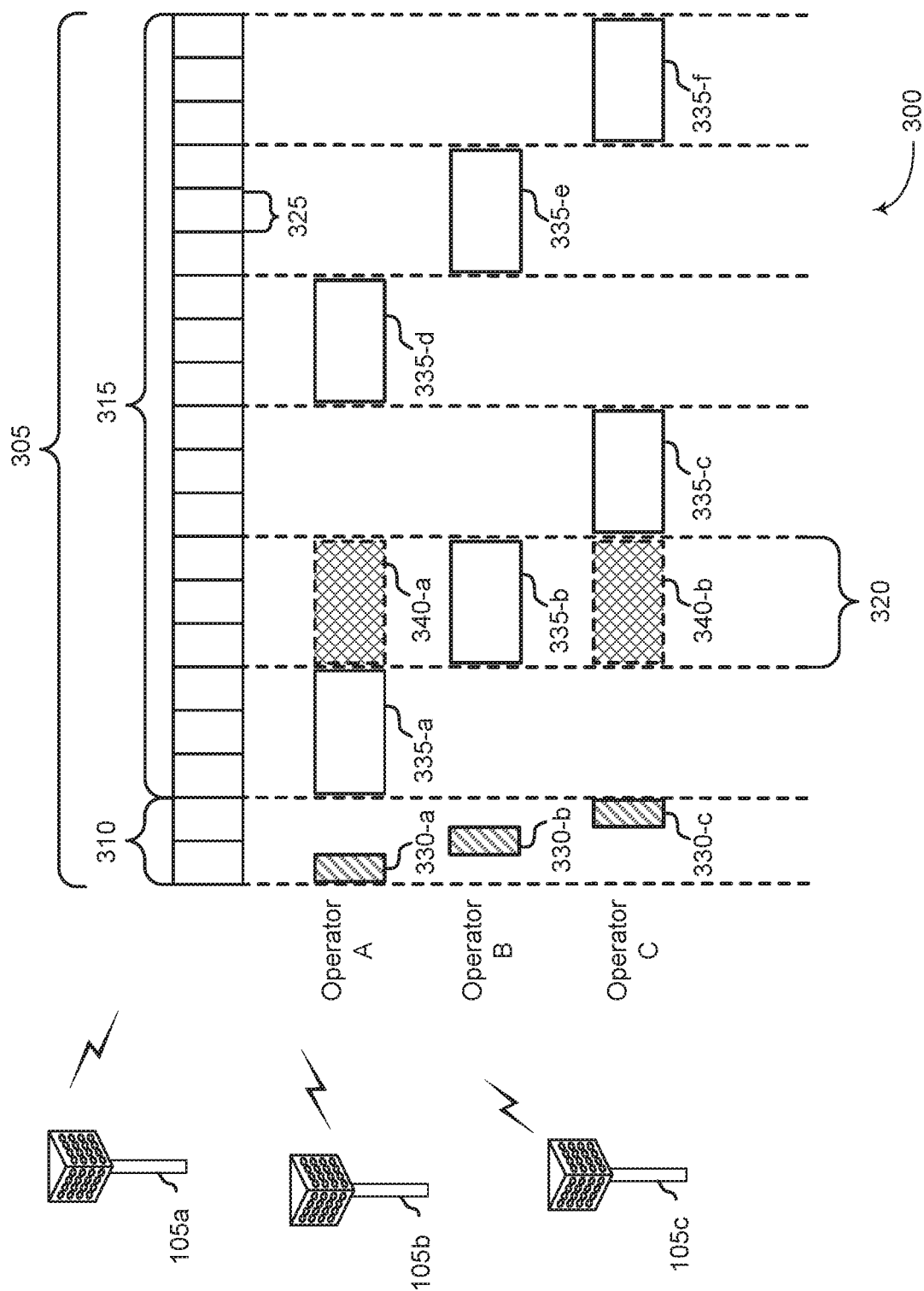
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-TNT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B (e.g., G-INT-OpB), resources 335-c may be prioritized for Operator C (e.g., G-INT-OpC), resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In LTE systems that use or aggregate unlicensed spectrum, such as LTE license assisted access (LAA), the LAA radio access technology employs a licensed anchor which supplements access to unlicensed spectrum using a listen before talk (LBT) procedure. LTE LAA transmission segments within a given channel occupancy time (COT) may generally support only uplink transmissions, only downlink transmission, or up to a single downlink to uplink switching. With the development of new radio (NR) communications technology, the near self-contained slot structure defined in NR for reduced latency and fast adaptations with regard to channel and traffic dynamics allows for support of multiple downlink-uplink switches within a COT for NR unlicensed (NR-U) deployments. This support of multiple within-COT downlink-uplink switches is a significant differentiator of NR-U from LTE LAA operations. The scheduled within-COT multiple downlink-uplink switching configuration may be transmitted in NR-U system information. Such as-scheduled switching configuration can be initiated by a COT-initiating network node after some successful communications with the target node. Where any expected response from the target may fail to occur, the transmitting network node may reclaim the transmission opportunity (TxOP) for other scheduled usage after a successful LBT procedure, such as a clear channel assessment (CCA).

Contention window (CW) management for NR-U operations has adopted a similar procedure as the CW management in LTE LAA-based operations. As such, a potential exists that a late-detected collision with another interfering transmission, whether within the same system or a neighboring system, such as WiFi, may cause wasted resources in the remainder of the COT when the collision triggers increase in the CW size effectively beyond the boundary of the current COT. The various aspects of the present disclosure provide for a conditional triggering of any as-scheduled within-COT switching configuration.

The concept of within-TxOP multiple downlink-uplink switches was initially implemented in WiFi technologies (e.g., IEEE 802.11e). WiFi technology relies on a request-to-send (RTS)/clear-to-send (CTS) contention management mechanism to guard a particular TxOP. Once the RTS/CTS secured the WiFi TxOP, WiFi allows TxOP bursts with multiple downlink-uplink switches as scheduled, but only as long as the scheduled responses are received within a short interframe spacing (SIFS) timeframe. If the WiFi TxOP was obtained using an RTS/CTS procedure and the first expected response was received within the SIFS timeframe, then WiFi rules would subsequently allow the initiating access point to regain the TxOP when later responses are not received within the SIFS. In such situations, the access point would perform a point coordination function interframe spacing (PIFS) CCA in order to reclaim the TxOP. However, unlike WiFi operations, NR-U does not use a similar RTS/CTS procedure for securing a COT. Accordingly, the various aspects of the present disclosure implement the conditional triggering of as-scheduled within-COT switching without a similar RTS/CTS procedure.

Figure 4:
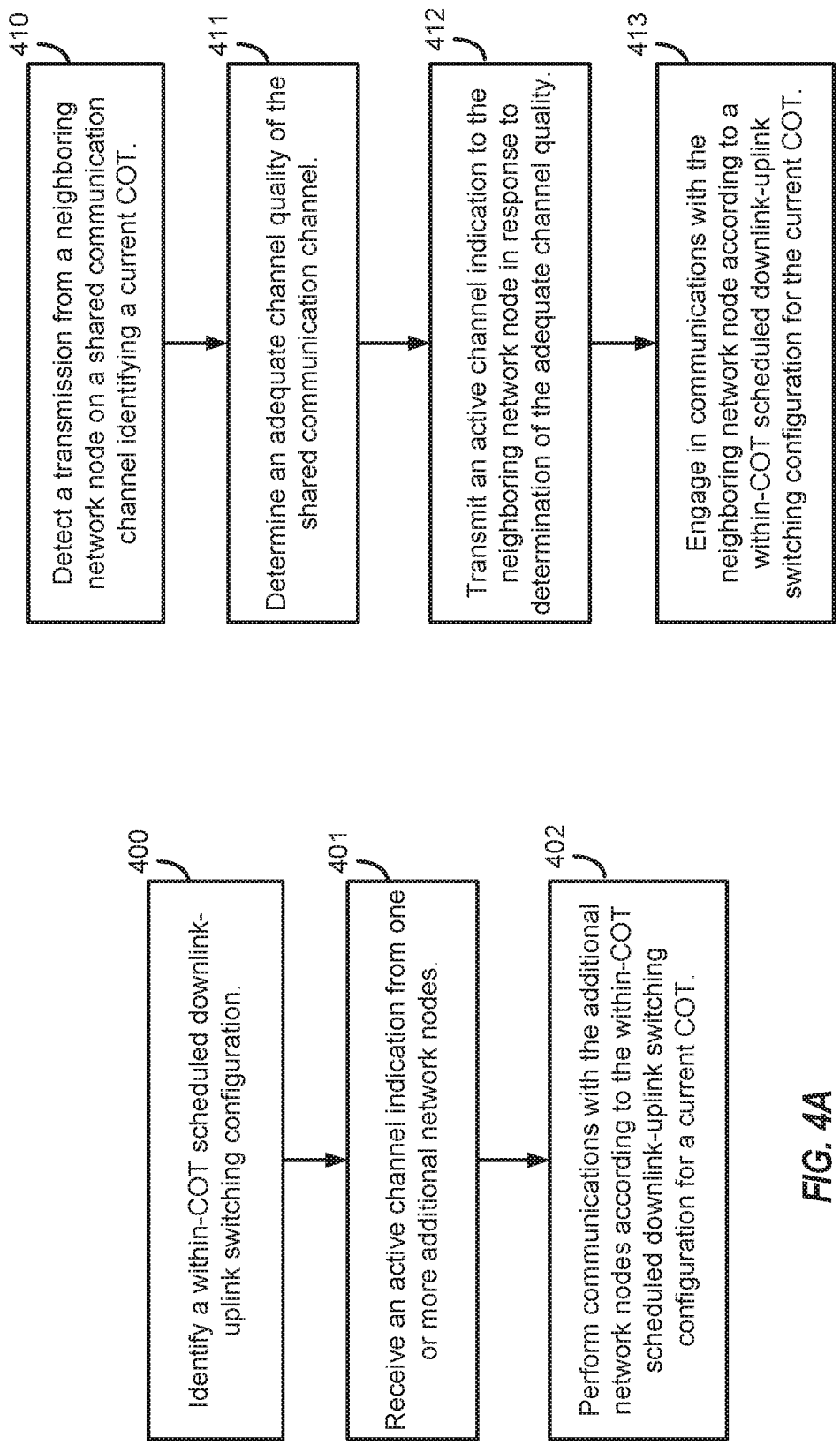
FIGS. 4A and 4B are block diagrams illustrating example blocks executed to implement aspects of the present disclosure.
Figure 8:
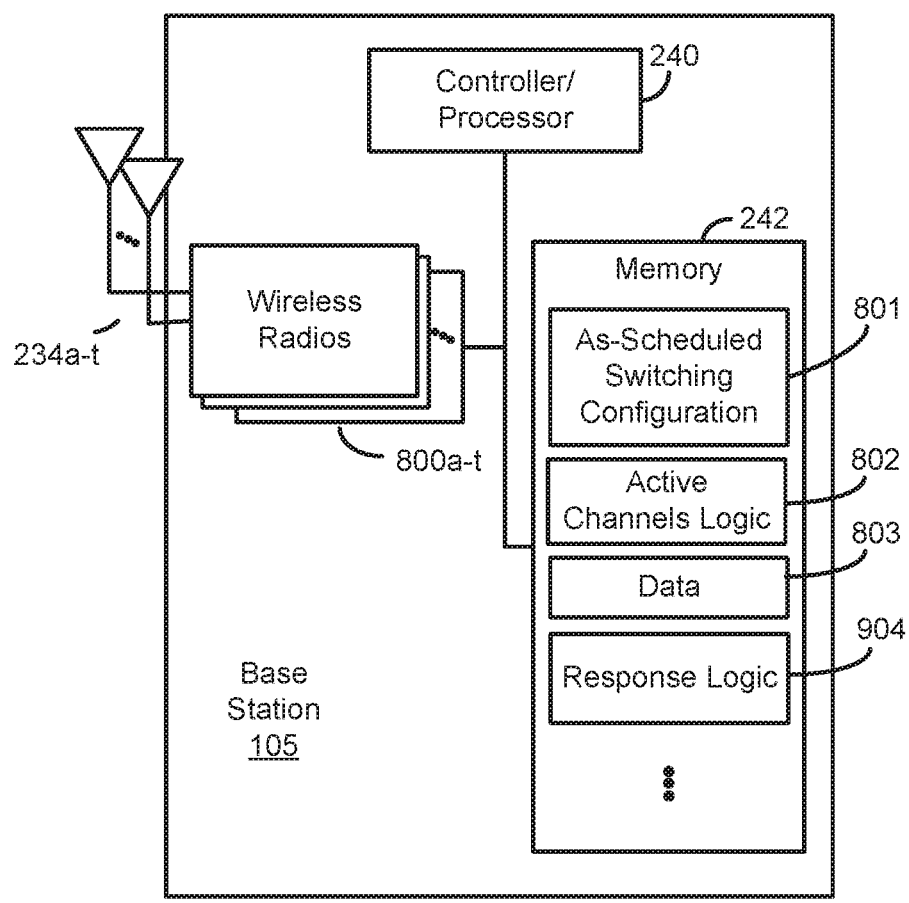
FIG. 8 is a block diagram illustrating an example base station configured according to one aspect of the present disclosure.

FIG. 4A is a block diagram illustrating example blocks executed to implement one aspect of the present disclosure. The example blocks will also be described with respect to base station 105 as illustrated in FIG. 8. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 800a-t and antennas 234a-t. Wireless radios 800a-t includes various components and hardware, as illustrated in FIG. 2 for base station 105, including modulator/demodulators 232*a-t*, MIMO detector 236, receive processor 238, transmit processor 220, and TX MIMO processor 230.

Figure 9:
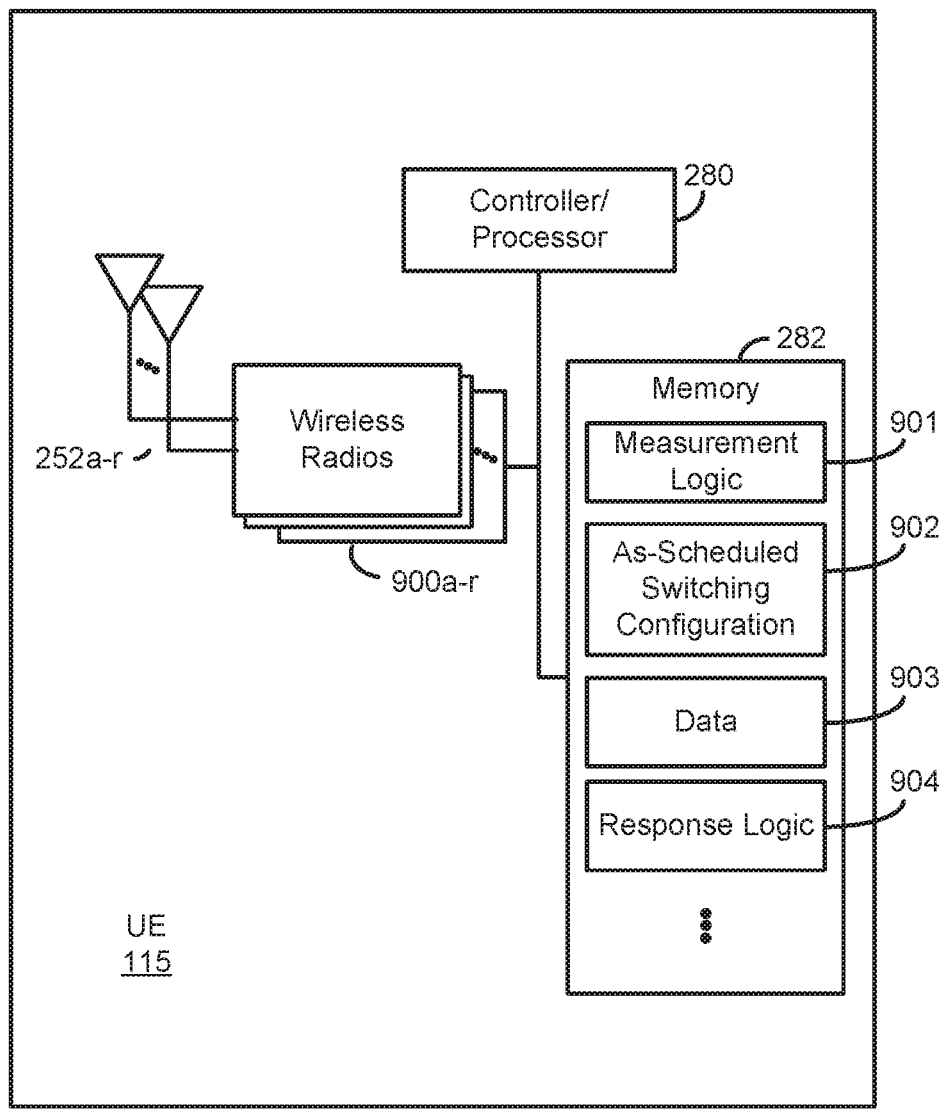
FIG. 9 is a block diagram illustrating an example UE configured according to one aspect of the present disclosure.

The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900*a-r* and antennas 252*a-r*. Wireless radios 900*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 400, a network node identifies a within-COT scheduled downlink-uplink switching configuration. The network node may be a base station or a UE that initiates the COT for transmissions. When the node is implemented as a UE, such as UE 115, UE 115 may receive the as-scheduled within-COT switching configuration through system information transmissions via antennas 252*a-r* and wireless radios 900*a-r* from the network or a serving base station. UE 115 would store the as-scheduled within-COT switching configuration at as-scheduled switching configuration 902, in memory 282. When the node is implemented as a base station, such as base station 105, or network may define the as-scheduled within-COT switching configuration for its communications. The as-scheduled within-COT switching configuration may be stored at as-scheduled switching configuration 801 in memory 242.

At block 401, the network node receives an active channel indication from one or more additional network nodes. To begin the COT, the initiating network node, either base station 105 or UE 115, may begin control and initial data transmissions to a number of other network nodes within communication. One or more of these other network nodes may respond with the active channel indication that identifies a successfully established communication channel between the two network nodes. Base station 105 would receive such active channel indication via antennas 234*a-t* and wireless radios 800*a-t* and store identification of the active channels with the other nodes in communication at active channel logic 802, in memory 242. UE 115 would receive such active channel indication via antennas 252*a-r* and wireless radios 900*a-r* within the execution environment of measurement logic 901, stored in memory 282 and executed under the control of controller/processor 280. An active channel indication may include any number of different signals or transmissions from the other nodes, such as an acknowledgement signal (e.g., a transport block (TB) acknowledgement, a code block group (CBG) acknowledgement) in response to any transmission by the COT-initiating network node (e.g., a downlink transmission in a base station-initiated COT, or an uplink transmission in a UE-initiated COT). An active channel indication may also include any data received at the initiating node that has a pre-determined set of modulation coding schemes (MCSs) for guaranteed signal-to-interference-plus-noise ratio (SINR). The active channel indication may further include control signal responses, such as a channel quality indicator (CQI), a sounding reference signal (SRS), or physical random access channel (PRACH) with respect to any control signal request transmitted over the current COT, or a request grant with pre-determined aggregation level(s) for guaranteed SINR. In certain aspects, an active channel indication may further include data that has been transmitted as scheduled by the node that initiates the COT (e.g., uplink data transmitted in a scheduled uplink transmission).

At block 402, the network node may then perform communications with the additional network nodes according to the within-COT scheduled downlink-uplink switching configuration for the current COT on a shared communication channel. Once the active channel indication has been received, the node, as configured as base station 105, would execute active channels logic 802 (under control of controller/processor 240). The execution environment of active channels logic 802 allows base station 105, the COT-initiating network node, to participate in communications with those other nodes from which it received an active channel indication according to the as-scheduled within-COT switching configuration. Moreover, while the active channel indication may be received over a different channel (e.g., the licensed anchor carrier in LAA deployments, or a completely separate radio interface), the communications according to the as-scheduled within-COT configuration occur over a shared communication channel. The communications performed between the nodes may include communicating data 803 via wireless radios 800*a-t* and antennas 234*a-t* when the network node is as base station 105, or communicating data 903 via wireless radios 900*a-r* and antennas 252*a-r*.

FIG. 4B is a block diagram illustrating example blocks executed to implement one aspect of the present disclosure. The example blocks will also be described with respect to base station 105, as illustrated in FIG. 8 and UE 115, as illustrated in FIG. 9.

At block 410, a network node detects a transmission from a neighboring network node on a shared communication channel identifying a current COT initiated by the neighboring network node. The network node, which may be implemented as a base station, such as base station 105, or a UE, such as UE 115, here, is the non-initiating network node. The network node detects a transmission from the neighboring node identifying the current COT in the shared spectrum. As base station 105, the receipt of communications from served UEs via antennas 234*a-t* and wireless radios 800*a-t* provides for base station 105 to detect communications from the served base station. As UE 115, execution, under control of controller/processor 280, executes measurement logic 901, in memory 282. The execution environment of measurement logic 901 provides for UE 115 to detect the signals and transmissions identifying the detected transmissions via antennas 252*a-r* and wireless radios 900*a-r*.

At block 411, the network node determines an adequate channel quality of the shared communication channel. The network node (e.g., base station 105 or UE 115) makes the determination either by successfully decoding the transmission or, where the decoding fails for another reason, such as puncturing in the transmission or the like, by determining that the quality of the channel with the neighboring node is adequate to support communications without interference or colliding and competing signals. Such determinations may be made by wireless radios 800*a-t*, under control of controller/processor 240, when the network node is implemented as base station 105, or wireless radios 900*a-r*, under control of controller/processor 280, when the network node is implemented as UE 115.

At block 412, the network node transmits an active channel indication to the neighboring network node in response to determination of the adequate channel quality. As noted above, the active channel indication may take the form of various different signals, including acknowledgment signals, response signals to control signal requests, scheduled transmissions, and the like. Accordingly, when the transmissions are detected by base station 105 or UE 115, respectively, base station 105/UE 115, under control of controller/processor 240/280, respectively, executes response logic 804/904, respectively. The execution environment of response logic 804/904 provides for the network node (base station 105/UE 115) to transmit a response according to one of the described features via wireless radios 800*a-t*/900*a-r* and antennas 234*a-t*/252*a-r*, respectively.

At block 413, the network node engages in communications with the neighboring network node according to a within-COT scheduled downlink-uplink switching configuration for the current COT on the shared communication channel. Once the active channel indication is transmitted, subsequent communications with the neighboring network node in the current COT may occur using the as-scheduled within-COT switching configuration. Accordingly, the network node (base station 105/UE 115) would participate in transmission and reception of data to and from data 803/903, respectively, via wireless radios 800*a-t*/antennas 234*a-t* and wireless radios 900*a-r*/antennas 252*a-r*.

Figure 5:
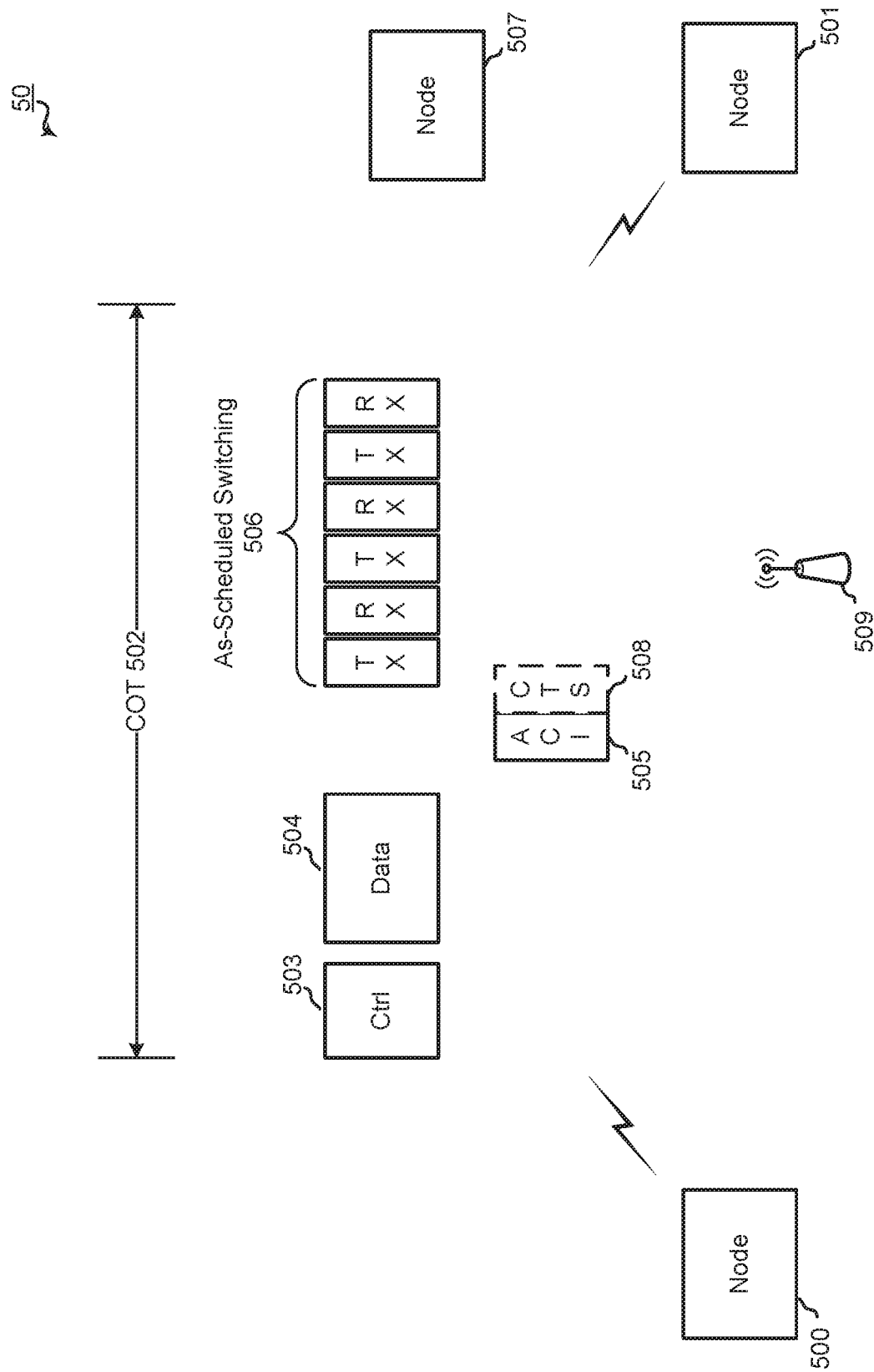
FIG. 5 is a block diagram illustrating a portion of a NR-U network having network nodes configured according to one aspect of the present disclosure.

FIG. 5 is a block diagram illustrating a portion of NR-U network 50 having network nodes 500, 501, and 507 configured according to one aspect of the present disclosure. Network node 500, which may be implemented as a base station or a UE, desires to perform communications and initiates COT 502 over a shared communication spectrum. COT 502 may be initiated by network node 500 perform an LBT procedure, such as an extended CCA (ECCA) procedure on the shared communication spectrum. Network node 500 identifies a within-COT scheduled downlink-uplink switching configuration. Network node 500, when implemented as a base station, may determine the within-COT switching configuration on its own or receive the configuration from another base station node to coordinate transmission scheduling within the network. When implemented as a UE, network node 500 may receive the within-COT switching configuration from a serving base station, such as, if network node 501 were the serving base station of a UE network node 500. The within-COT switching configuration may be considered a part of the system information for the illustrated area of NR-U network 50.

After initiating COT 502, network node 500 begins transmission of control signals 503 and a data transmission 504. Signals within either or both of control signals 503 and data transmission 504 may be transmitted from network node 500 to both of network nodes 501 and 507. Network node 500 receives an active channel indication (ACI) 505 from network node 501. As noted above, ACI 505 may take various forms, such as an acknowledgement signal, a control signal response, scheduled transmission, or the like. As illustrated, network node 500 receives ACI 505 over a licensed anchor carrier between network node 501 and network node 500. In response to receiving ACI 505, network node 500 may participate in communication in COT 502 with network node 501 using as-scheduled switching 506 configured according to the as-scheduled within-COT switching configuration.

Figure 6A:
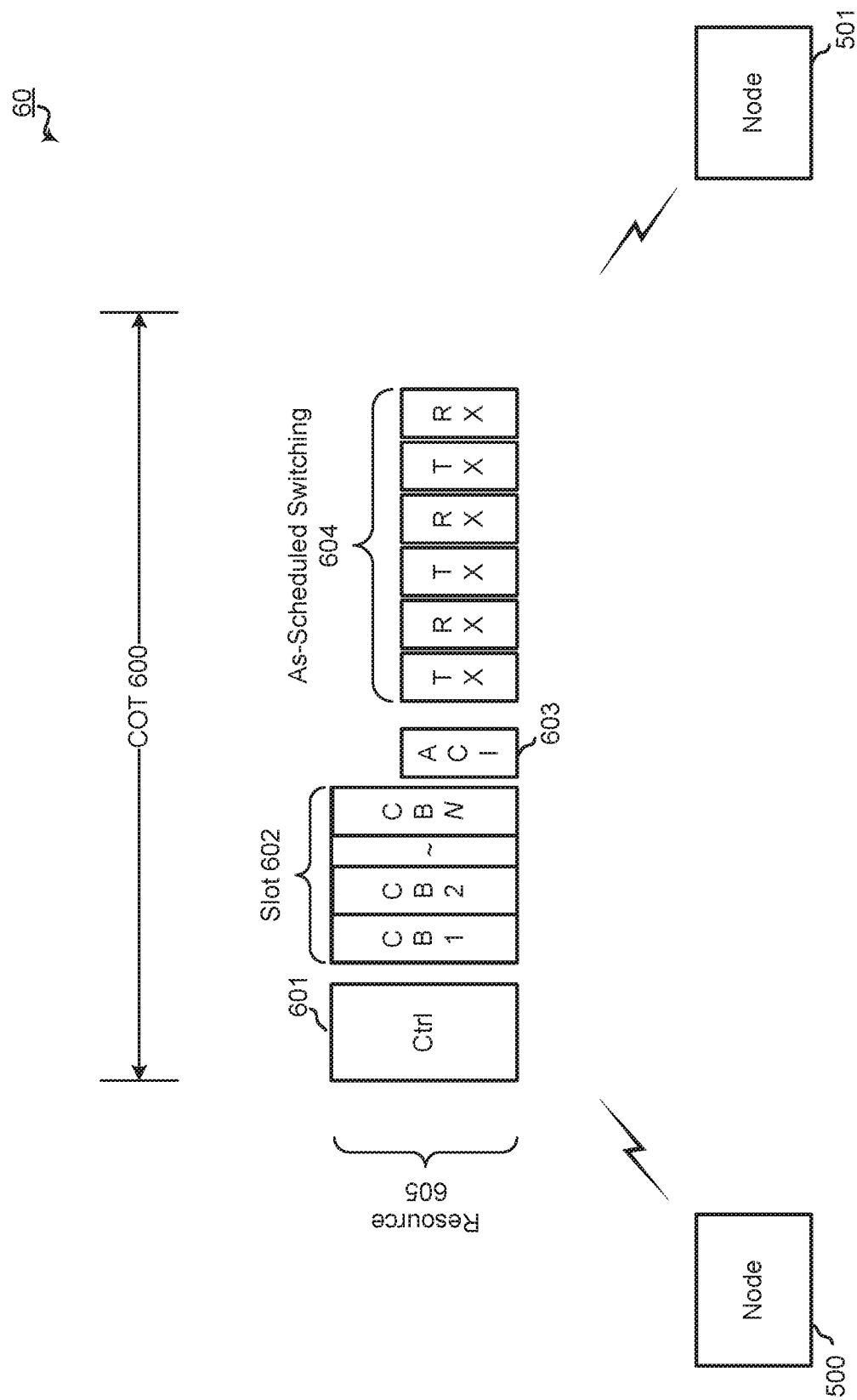
FIGS. 6A-6C are block diagrams illustrating a portion of a NR-U network having network nodes configured according to one aspect of the present disclosure.

FIG. 6A is a block diagram illustrating a portion of NR-U network 60 having network nodes 500 and 501 configured according to one aspect of the present disclosure. Network node 500 desires to conduct communications and initiates COT 600 as noted above. As the start of COT 600, network node transmits control signals 601 and data transmissions in slot 602. The data transmissions in slot 602 comprise a concatenation of multiple code blocks (CB1-CBN). As configured according to the aspect illustrated in FIG. 6A, network node 501 transmits ACI 603 that provides a code block group-level acknowledgement of the code block group including CB1 and CB2. While a full transport block is transmitted within slot 602, the illustrated aspect provides early feedback mechanism which acknowledges CB1 and CB2 of the full transport block of slot 602. This accelerated decoding allows for network node 500 to receive ACI 603 earlier in COT 600 than if the entire transport block of data in slot 602 would have to first be decoded by network node 501 and acknowledged.

In response to ACI 603, network node 500 may participated in communications with network node 501 using as-scheduled switching 604 configured according to the as-scheduled within-COT downlink-uplink switching configuration identified by network node 500 as described above. The described aspect further illustrates that ACI 603 may be resource dependent. As such, in initiating COT 600, network node 500 uses the allocated COT resource bandwidth 605. However, network node 501 only accesses a portion of COT resource bandwidth 605 with the transmission of ACI 603. The communications that occur according to as-scheduled switching 604 would then occur between network node 500 and 501 using the same portion of COT resource bandwidth 605 as used for ACI 603. The portion of COT resource bandwidth 605 may represent a particular carrier, subband, or beam within the full COT resource bandwidth.

Figure 6B:
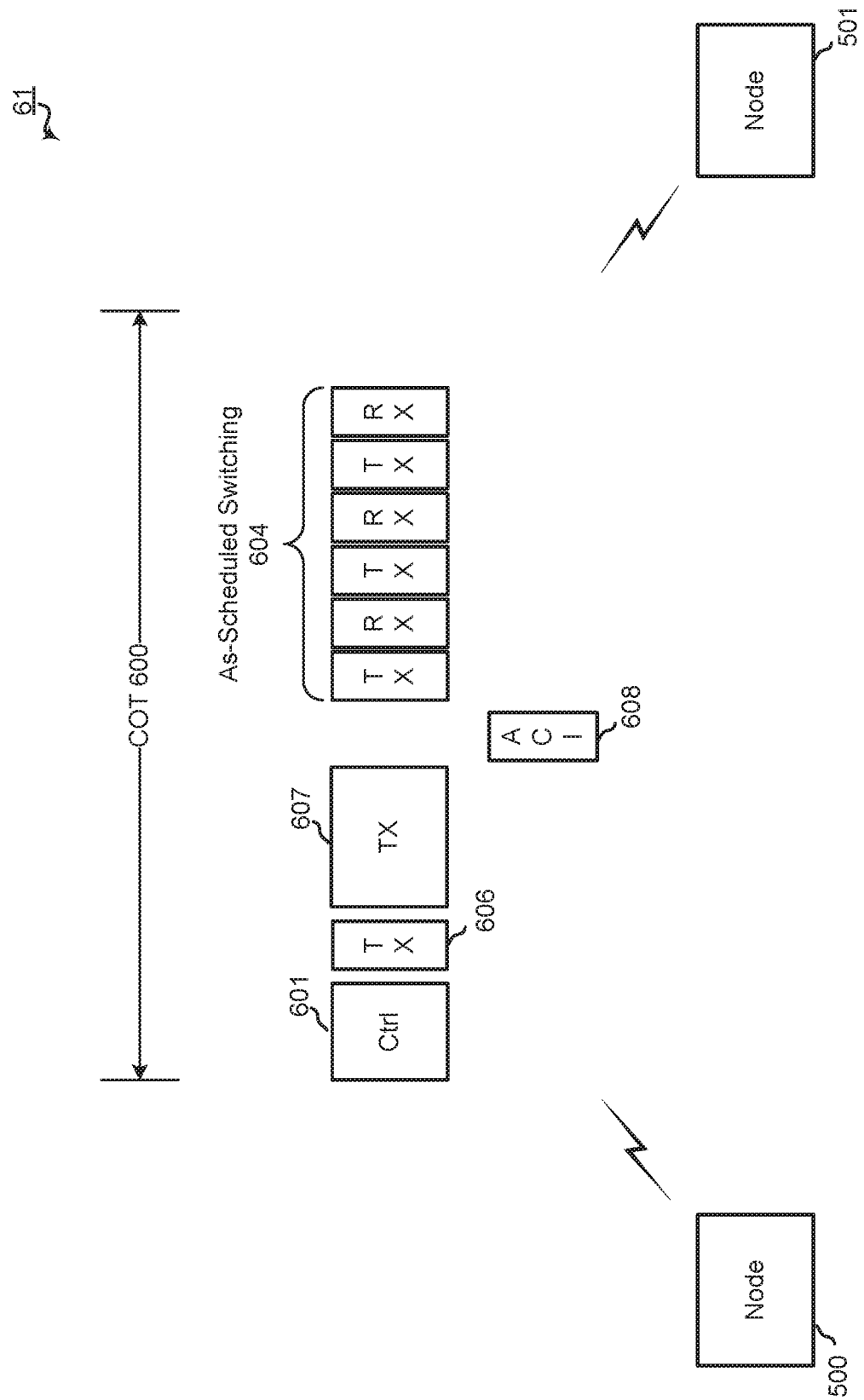

FIG. 6B is a block diagram illustrating a portion of NR-U network 61 having network nodes 500 and 501 configured according to one aspect of the present disclosure. As with respect to FIGS. 5 and 6A, network node 500 desires to conduct communications and initiates COT 600 and begins with transmission of control signals 601. According to the aspect illustrated in FIG. 6B, a specific rate matching scheme is used to transmit a mini-slot 606 followed by a regular data transmission in slot 607. The transmission of mini-slot 606 allows for network node 501 to respond with an early acknowledgement, ACI 608. Thus, the introduction of mini-slot 606, for example, accelerates decoding or allows early feedback. In response to this early feedback, ACI 608, network node 500 and 501 may participated in communications using as-scheduled switching 604 according to the as-scheduled within-COT switching configuration.

In a further example aspect illustrated by FIG. 6B, the acknowledgement signal included with ACI 608 represents a negative acknowledgement identifying that network node 501 did not successfully decode the subject transmission from network node 500. However, in the further example aspect, ACI 608 includes enriched feedback sent along with the negative acknowledgement. The enriched feedback within ACI 608 can be interpreted by network node 500 as an active channel indication when the negative acknowledgement was caused by something other than signal collision or interference, such as by cyclic redundancy check (CRC) failure due to code puncturing. Where such conditions cause the failure, the enriched feedback within ACI 608 indicates very small interference, such as through a large enough SINR, large enough instantaneous mutual information, large enough demodulation reference signal (DMRS) CQI, smaller error vector magnitude (EVM), or with a CRC pass of a sub-code of low density parity check (LDPC)-coded data.

Figure 6C:
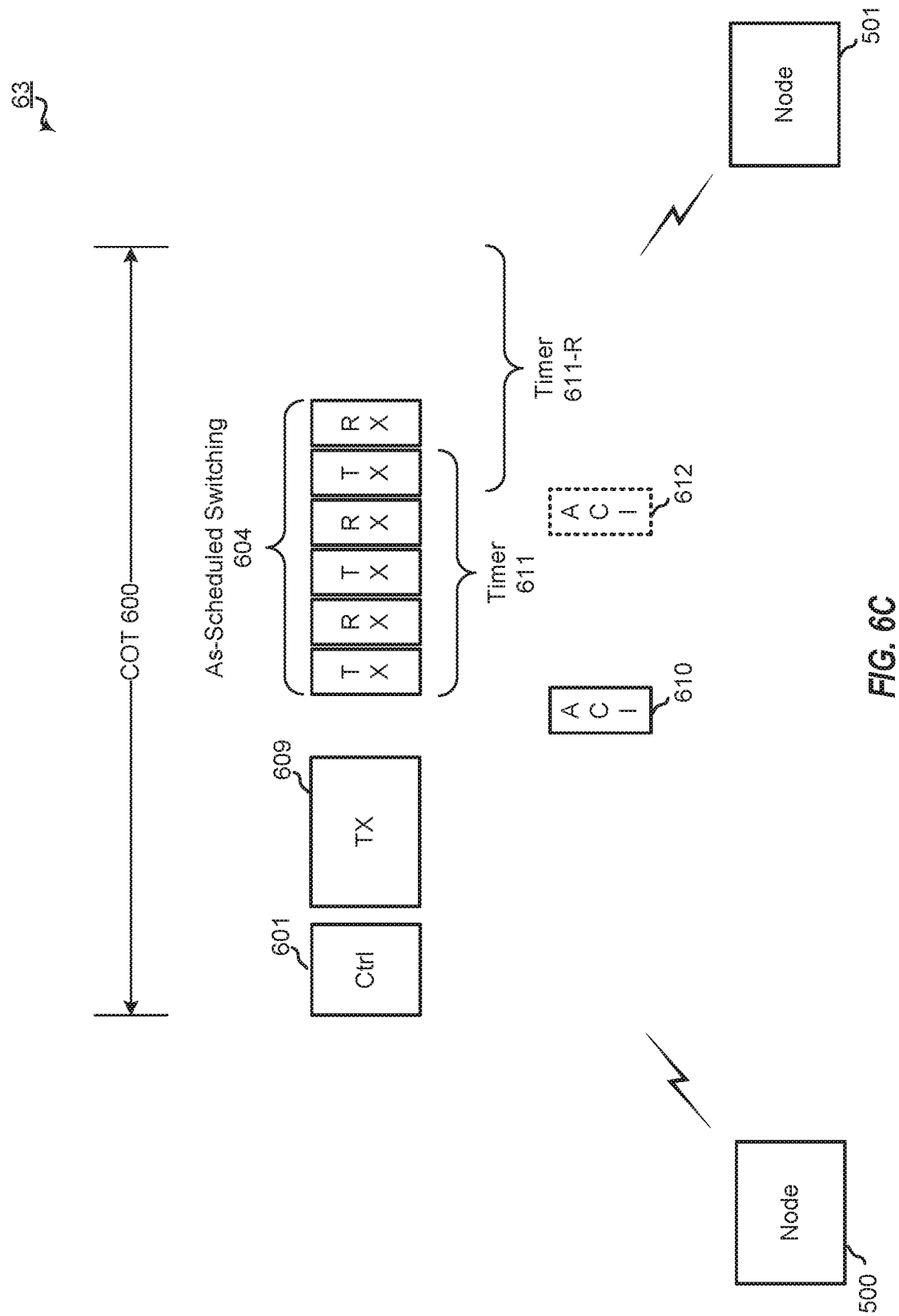

FIG. 6C is a block diagram illustrating a portion of NR-U network 63 having network nodes 500 and 501 configured according to one aspect of the present disclosure. As with respect to FIGS. 5, 6A, and 6B, network node 500 desires to conduct communications and initiates COT 600 and begins with transmission of control signals 601 and data transmission in slot 609. Network node 500 receives ACI 610 from network node 501. ACI 610 may comprise any of the different signals described above that indicate an active, quality channel between network nodes 500 and 501. According to the aspect illustrated in FIG. 6C, in response to ACI 610, network node 500 initiates timer 611. Timer 611 provides the window of COT 600 within which network node 500 may communicate using as-scheduled switching 604 according to the as-scheduled within-COT switching configuration. For example, as illustrated, when timer 611 expires, network node 500 would not be able to continue the final RX segment of as-scheduled switching 604.

It should be noted, however, that timer 611 may be reset for each additional active channel indication received by network node 500. For example, network node 501 transmits ACI 612 to network node 500 indicating an acknowledgement of one of the TX segments of as-scheduled switching 604. In response, network node 500 resets timer 611 (timer 611-R). The continuation of timer 611-R would allow network node 500 to finish all switching segments of as-scheduled switching 604 for COT 600.

Figure 7:
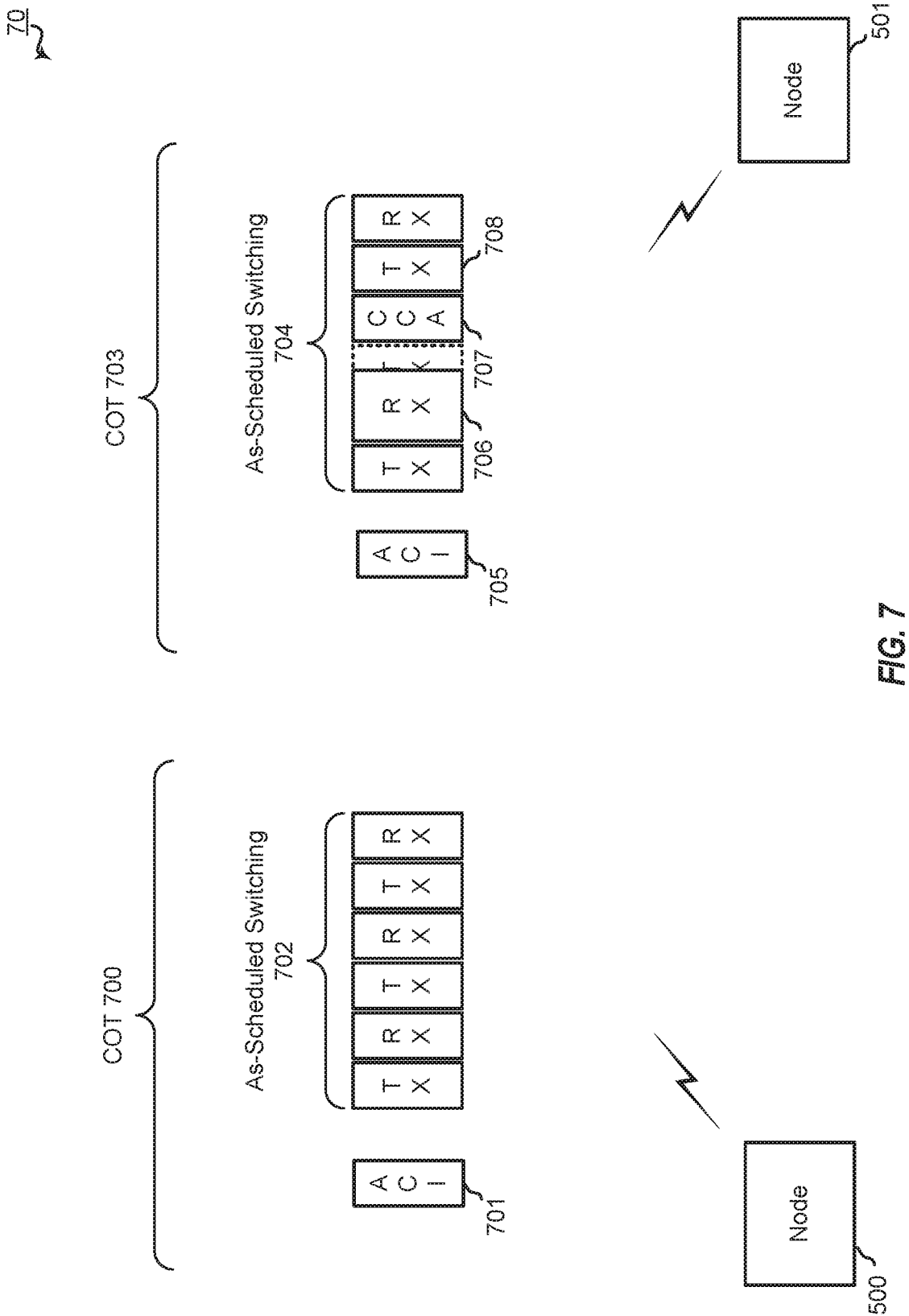
FIG. 7 is a block diagram illustrating a portion of a NR-U network having network nodes configured according to one aspect of the present disclosure.

FIG. 7 is a block diagram illustrating a portion of NR-U network 70 having network nodes 500 and 501 configured according to one aspect of the present disclosure. Network node 501 desires to conduct transmissions and initiates COT 700 for transmission and then initiates COT 702 for additional transmissions. For COT 700, in response to ACIs 701 and 705 received from network node 500, network node 501 performs communications with network node 500 using as-scheduled switchings 702 and 704, respectively, configured according to the as-scheduled within-COT switching configuration. Such configurations can limited the response transmissions (RX) to a threshold number, X, of OFDM-symbols. The number of symbols, X, may be small enough to minimize the likelihood that another transmitter may occupy the shared communication spectrum while network node 501 is waiting for network node 500 to transmit the RX (e.g., 1 symbol, 2 symbols, or the like). Within COT 703, network node 500 has a RX transmission at 706 that is longer than the threshold symbol limit, X. Network node 501 may or may not have received the RX. Accordingly, before network node 501 may continue transmissions within as-scheduled switching 704, network node 501 performs CCA 707 to reclaim COT 703. Upon detecting success of CCA 707, network node 501 may continue transmissions at TX 708.

To further protect a COT with multiple as-scheduled switching points in NR-U, additional aspects of the present disclosure may provide for a channel reservation signal in different radio access technology to be sent along with the active channel indication. Referring back to FIG. 5, in addition to ACI 505, network node 501 sends CTS 508 as a WiFi packet (e.g., a CTS-2-self packet). A neighboring WiFi node, node 509, may receive CTS 508 and realize that the shared communication spectrum is occupied. It may then back-off connection or transmission attempts by setting its network allocation vector (NAV) to a value from the point of reception to the end of COT 502. In selected aspects, network node 500 may not be capable of reading or decoding CTS 508, while in other aspects, network node 500 may have the capability to read CTS 502, but, as a signal directed to a different radio access technology, would not provide any feedback or signaling based on CTS 502. Thus, by transmitting signaling for a different radio access technology that shares the same shared communication spectrum, the illustrated additional aspect further protects the spectrum for competing and potentially colliding signals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4A and 4B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   identifying, by a network node, a within-channel occupancy time (COT) scheduled downlink-uplink switching configuration;
   receiving, by the network node, an active channel indication from one or more additional network nodes; and
   performing, by the network node, communications with the one or more additional network nodes according to the within-COT scheduled downlink-uplink switching configuration for a current COT on a shared communication channel,
   wherein the within-COT scheduled downlink-uplink switching configuration limits scheduled transmissions to the network node to a predetermined number of symbols.

2. The method of claim 1, wherein the active channel indication is received via one of:
   the shared communication channel;
   a licensed non-contention communication channel between the network node and the one or more additional network nodes; or
   an alternative radio resource available to the network node.

3. The method of claim 1, wherein the active channel indication received in the current COT initiated by the network node includes one of:
   an acknowledgement signal identifying successful receipt of a prior transmission of the network node to the one or more additional network nodes within the current COT;
   receipt of a data transmission from the one or more additional network nodes within the current COT, wherein the data transmission was scheduled by the network node;
   receipt of a control response from the one or more additional network nodes within the current COT to a control signal transmitted by the network node within the current COT; or
   additional feedback received with a negative acknowledgement signal identifying unsuccessful receipt of the prior transmission, wherein the additional feedback identifies that the unsuccessful receipt of the prior transmission is due to one or more factors unassociated with an active condition of the shared communication channel between the network node and the one or more additional network nodes.

4. The method of claim 1, further including:
   initiating, by the network node, the current COT,
   wherein the receiving the active channel indication is in response to a first transmission segment of the current COT, wherein the first transmission segment includes one of: a mini-slot transmission, or a first code block group of a full slot transmission.

5. The method of claim 4, further including:
   engaging, by the network node, in transmissions according to a modified rate matching scheme in response to the initiating, wherein the modified rate matching scheme enables transmission, by the network node, of the mini-slot transmission.

6. The method of claim 1, further including:
   for each other network node in communication with the network node other than the one or more additional network nodes, performing, by the network node, other communications with the each other network node according to a communication configuration other than the within-COT scheduled downlink-uplink switching configuration for the current COT.

7. The method of claim 1,
   wherein the active channel indication is received on a portion of radio resources allocated for the current COT, and
   wherein the communications are performed using the portion of radio resources of the current COT.

8. The method of claim 7, wherein the portion of the radio resources includes one of:
one or more carriers;
one or more subbands; or
one or more beams.

9. The method of claim 1, wherein the performing the communications includes:
activating a switching configuration timer in response to receipt of the active channel indication;
performing the communications according to the within-COT scheduled downlink-uplink switching configuration during activation of the switching configuration timer; and
ceasing the communications according to the within-COT scheduled downlink-uplink switching configuration on expiration of the switching configuration timer.

10. The method of claim 9, further including:
receiving, by the network node, another active channel indication from one or more other network nodes within the current COT; and
resetting, by the network node, the switching configuration timer in response to the receiving the another active channel indication.

11. The method of claim 1,
wherein the network node performs transmissions to the one or more additional network nodes according to the within-COT scheduled downlink-uplink switching configuration when transmissions received at the network node from the one or more additional network nodes are within the predetermined number of symbols, and
wherein the network node performs a successful listen before talk (LBT) procedure on the shared communication channel before further transmissions to the one or more additional network nodes when the transmissions received at the network node from the one or more additional network nodes exceed the predetermined number of symbols.

12. The method of claim 1, further including:
receiving, at the network node, a channel reservation signal along with the active channel indication, wherein the channel reservation signal is configured according to a different radio access technology that uses the shared communication channel.

13. A method of wireless communication, comprising:
detecting, by a network node, a transmission from a neighboring network node on a shared communication channel identifying a current channel occupancy time (COT) initiated by the neighboring network node;
determining, by the network node, an adequate channel quality of the shared communication channel;
transmitting, by the network node, an active channel indication to the neighboring network node in response to determination of the adequate channel quality; and
engaging, by the network node, in communications with the neighboring network node according to a within-COT scheduled downlink-uplink switching configuration for the current COT on the shared communication channel,
wherein the within-COT scheduled downlink-uplink switching configuration limits scheduled transmissions to the neighboring network node to a predetermined number of symbols.

14. The method of claim 13, wherein the active channel indication is transmitted via one of:
the shared communication channel;
a licensed non-contention communication channel between the network node and the neighboring network node; or
an alternative radio resource available to the network node and the neighboring network node.

15. The method of claim 13, wherein the active channel indication transmitted in the current COT initiated by the neighboring network node includes one of:
an acknowledgement signal identifying successful receipt of a prior transmission of the neighboring network node by the network node within the current COT;
transmission of a data transmission from the network node within the current COT, wherein the data transmission was scheduled by the neighboring network node;
transmission of a control response from the network node within the current COT to a control signal received by the network node from the neighboring network node within the current COT; or
additional feedback transmitted by the network node with a negative acknowledgement signal identifying unsuccessful receipt of the prior transmission, wherein the additional feedback identifies that the unsuccessful receipt of the prior transmission is due to one or more factors unassociated with the adequate channel quality of the shared communication channel between the network node and the neighboring network node.

16. The method of claim 13, wherein the transmitting the active channel indication is in response to a first transmission segment of the current COT from the neighboring network node, wherein the first transmission segment includes one of: a mini-slot transmission, or a first code block group of a full slot transmission.

17. The method of claim 13,
wherein the active channel indication is transmitted on a portion of radio resources allocated for the current COT, and
wherein the communications are engaged in using the portion of radio resources of the current COT.

18. The method of claim 17, wherein the portion of the radio resources includes one of:
one or more carriers;
one or more subbands; or
one or more beams.

19. The method of claim 13, further including:
transmitting, at the network node, a channel reservation signal along with the active channel indication, wherein the channel reservation signal is configured according to a different radio access technology that uses the shared communication channel.

20. An apparatus configured for wireless communication, the apparatus comprising:
at least one processor; and
a memory coupled to the at least one processor,
wherein the at least one processor is configured:
to identify, by a network node, a within-channel occupancy time (COT) scheduled downlink-uplink switching configuration;
to receive, by the network node, an active channel indication from one or more additional network nodes; and
to perform, by the network node, communications with the one or more additional network nodes according to the within-COT scheduled downlink-uplink switching configuration for a current COT on a shared communication channel, wherein the within-COT scheduled downlink-uplink switching configuration limits scheduled transmissions to the network node to a predetermined number of symbols.

21. The apparatus of claim 20, wherein the active channel indication is received via one of:
   the shared communication channel;
   a licensed non-contention communication channel between the network node and the one or more additional network nodes; or
   an alternative radio resource available to the network node.

22. The apparatus of claim 20, wherein the active channel indication received in the current COT initiated by the network node includes one of:
   an acknowledgement signal identifying successful receipt of a prior transmission of the network node to the one or more additional network nodes within the current COT;
   receipt of a data transmission from the one or more additional network nodes within the current COT, wherein the data transmission was scheduled by the network node;
   receipt of a control response from the one or more additional network nodes within the current COT to a control signal transmitted by the network node within the current COT; or
   additional feedback received with a negative acknowledgement signal identifying unsuccessful receipt of the prior transmission, wherein the additional feedback identifies that the unsuccessful receipt of the prior transmission is due to one or more factors unassociated with an active condition of the shared communication channel between the network node and the one or more additional network nodes.

23. The apparatus of claim 20, further including configuration of the at least one processor:
   to initiate, by the network node, the current COT,
   wherein the configuration of the at least one processor to receive the active channel indication is executed in response to a first transmission segment of the current COT, wherein the first transmission segment includes one of: a mini-slot transmission, or a first code block group of a full slot transmission.

24. The apparatus of claim 20,
   wherein the network node performs transmissions to the one or more additional network nodes according to the within-COT scheduled downlink-uplink switching configuration when transmissions received at the network node from the one or more additional network nodes are within the predetermined number of symbols, and
   wherein the network node performs a successful listen before talk (LBT) procedure on the shared communication channel before further transmissions to the one or more additional network nodes when the transmissions received at the network node from the one or more additional network nodes exceed the predetermined number of symbols.

25. The apparatus of claim 20, further including configuration of the at least one processor to receive, at the network node, a channel reservation signal along with the active channel indication, wherein the channel reservation signal is configured according to a different radio access technology that uses the shared communication channel.

26. An apparatus configured for wireless communication, the apparatus comprising:
   at least one processor; and
   a memory coupled to the at least one processor,
   wherein the at least one processor is configured:
      to detect, by a network node, a transmission from a neighboring network node on a shared communication channel identifying a current channel occupancy time (COT) initiated by the neighboring network node;
      to determine, by the network node, an adequate channel quality of the shared communication channel;
      to transmit, by the network node, an active channel indication to the neighboring network node in response to determination of the adequate channel quality; and
      to engage, by the network node, in communications with the neighboring network node according to a within-COT scheduled downlink-uplink switching configuration for the current COT on the shared communication channel,
   wherein the within-COT scheduled downlink-uplink switching configuration limits scheduled transmissions to the neighboring network node to a predetermined number of symbols.

27. The apparatus of claim 26, wherein the active channel indication is transmitted via one of:
   the shared communication channel;
   a licensed non-contention communication channel between the network node and the neighboring network node; or
   an alternative radio resource available to the network node and the neighboring network node.

28. The apparatus of claim 26, wherein the active channel indication transmitted in the current COT initiated by the neighboring network node includes one of:
   an acknowledgement signal identifying successful receipt of a prior transmission of the neighboring network node by the network node within the current COT;
   transmission of a data transmission from the network node within the current COT, wherein the data transmission was scheduled by the neighboring network node;
   transmission of a control response from the network node within the current COT to a control signal received by the network node from the neighboring network node within the current COT; or
   additional feedback transmitted by the network node with a negative acknowledgement signal identifying unsuccessful receipt of the prior transmission, wherein the additional feedback identifies that the unsuccessful receipt of the prior transmission is due to one or more factors unassociated with the adequate channel quality of the shared communication channel between the network node and the neighboring network node.

29. The apparatus of claim 26, wherein the configuration of the at least one processor to transmit the active channel indication is in response to a first transmission segment of the current COT from the neighboring network node, wherein the first transmission segment includes one of: a mini-slot transmission, or a first code block group of a full slot transmission.

30. The apparatus of claim 26,
   wherein the active channel indication is transmitted on a portion of radio resources allocated for the current COT, and
   wherein the communications are engaged in using the portion of radio resources of the current COT.

* * * * *